United States Patent
Gusev et al.

(10) Patent No.: US 11,888,605 B2
(45) Date of Patent: *Jan. 30, 2024

(54) METHODS AND SYSTEMS FOR MAKING EFFECTIVE USE OF SYSTEM RESOURCES

(71) Applicant: Salesforce, Inc., San Francisco, CA (US)

(72) Inventors: Andrey Gusev, San Francisco, CA (US); Ronald Yang, Cupertino, CA (US); Scott Hansma, San Francisco, CA (US); Jesse Collins, Oakland, CA (US); Alan Arbizu, Foster City, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,301

(22) Filed: Sep. 28, 2022

(65) Prior Publication Data
US 2023/0016877 A1 Jan. 19, 2023

Related U.S. Application Data

(63) Continuation of application No. 17/070,836, filed on Oct. 14, 2020, now Pat. No. 11,496,555, which is a
(Continued)

(51) Int. Cl.
*H04L 47/125* (2022.01)
*H04L 67/1008* (2022.01)
(Continued)

(52) U.S. Cl.
CPC ........ *H04L 67/1008* (2013.01); *G06F 9/5011* (2013.01); *G06F 16/2455* (2019.01);
(Continued)

(58) Field of Classification Search
CPC ............... H04L 42/0876; H04L 47/125; H04L 67/1014; H04L 67/10; H04L 69/329
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |

(Continued)

FOREIGN PATENT DOCUMENTS

| | | | | |
|---|---|---|---|---|
| CA | 2636091 A1 | * | 7/2007 | ....... G06F 17/30569 |
| CA | 2638905 A1 | | 8/2007 | |

OTHER PUBLICATIONS

Crossbroker: A Grid Metascheduler for Interactive and Parallel Jobs Enol Fernandez, Andres Cencerrado Elisa Heymann, Miquel A. Senar Published: 2008.

(Continued)

*Primary Examiner* — Khanh Q Dinh
(74) *Attorney, Agent, or Firm* — Kwan & Olynick LLP

(57) ABSTRACT

Methods and systems for making effective use of system resources. A plurality of requests for access to a resource are received. Each request has an associated group of features. The group of features for each request is analyzed to collect observations about the plurality of requests. A function to predict an outcome of a subsequent request is generated based on the observations. Resources are allocated to service the subsequent request based on the function.

20 Claims, 5 Drawing Sheets

Related U.S. Application Data continuation of application No. 16/259,964, filed on Jan. 28, 2019, now Pat. No. 10,810,514, which is a continuation of application No. 14/703,682, filed on May 4, 2015, now Pat. No. 10,192,169, which is a continuation of application No. 13/276,531, filed on Oct. 19, 2011, now Pat. No. 9,026,624.

(60) Provisional application No. 61/421,989, filed on Dec. 10, 2010.

(51) Int. Cl.
*H04L 49/90* (2022.01)
*G06N 20/00* (2019.01)
*G06F 16/2455* (2019.01)
*H04L 69/329* (2022.01)
*H04L 67/1014* (2022.01)
*H04L 67/1001* (2022.01)
*G06F 9/50* (2006.01)
*H04L 43/0876* (2022.01)
*H04L 67/10* (2022.01)

(52) U.S. Cl.
CPC ......... *G06N 20/00* (2019.01); *H04L 43/0876* (2013.01); *H04L 47/125* (2013.01); *H04L 49/90* (2013.01); *H04L 67/10* (2013.01); *H04L 67/1001* (2022.05); *H04L 67/1014* (2013.01); *H04L 69/329* (2013.01); *G06F 2209/5019* (2013.01)

(56) References Cited

U.S. PATENT DOCUMENTS

| | | |
|---|---|---|
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |
| 5,963,953 A | 10/1999 | Cram |
| 6,091,709 A | 7/2000 | Harrison |
| 6,092,083 A | 7/2000 | Brodersen |
| 6,128,279 A | 10/2000 | O'Neil |
| 6,169,534 B1 | 1/2001 | Raffel |
| 6,178,425 B1 | 1/2001 | Brodersen |
| 6,189,011 B1 | 2/2001 | Lim |
| 6,216,135 B1 | 4/2001 | Brodersen |
| 6,233,617 B1 | 5/2001 | Rothwein |
| 6,266,669 B1 | 7/2001 | Brodersen |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,434,550 B1 | 8/2002 | Warner |
| 6,446,089 B1 | 9/2002 | Brodersen |
| 6,463,454 B1 | 10/2002 | Lumelsky |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,665,648 B2 | 12/2003 | Brodersen |
| 6,665,655 B1 | 12/2003 | Warner |
| 6,684,438 B2 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 6,850,953 B2 | 2/2005 | Deshpande |
| 6,877,034 B1 | 4/2005 | Machin |
| 7,062,556 B1 | 6/2006 | Chen |
| 7,240,136 B2 | 7/2007 | Anand |
| 7,289,976 B2 | 10/2007 | Kihneman |
| 7,340,411 B2 | 3/2008 | Cook |
| 7,409,335 B1* | 8/2008 | Horvitz ................. G06F 40/35 |
| | | 707/999.005 |
| 7,472,159 B2 | 12/2008 | Freimuth |
| 7,620,655 B2 | 11/2009 | Larsson |
| 7,669,051 B2 | 2/2010 | Redlich |
| 8,159,961 B1 | 4/2012 | Rai |
| 8,160,056 B2 | 4/2012 | Van Der Merwe |
| 8,176,563 B2 | 5/2012 | Redlich |
| 8,200,527 B1 | 6/2012 | Thompson |
| 8,290,995 B1 | 10/2012 | Hu |
| 8,503,749 B2 | 8/2013 | Tobin |
| 8,639,563 B2 | 1/2014 | Angell |
| 8,755,297 B2 | 6/2014 | Kalavade |
| 8,880,640 B2 | 11/2014 | Graham |
| 9,026,624 B2 | 5/2015 | Gusev |
| 9,183,560 B2 | 11/2015 | Abelow |
| 9,311,499 B2 | 4/2016 | Redlich |
| 9,672,474 B2 | 6/2017 | Dirac |
| 10,142,204 B2 | 11/2018 | Nickolov |
| 10,192,169 B2 | 1/2019 | Gusev |
| 10,608,911 B2 | 3/2020 | Nickolov |
| 10,810,514 B2 | 10/2020 | Gusev |
| 11,061,727 B1* | 7/2021 | Gnyp ................. G06F 16/2477 |
| 11,321,296 B1* | 5/2022 | Rivers ................. G06F 16/2272 |
| 11,373,098 B2 | 6/2022 | Hoshizuki |
| 11,496,555 B2* | 11/2022 | Gusev ................... G06N 20/00 |
| 11,620,285 B2* | 4/2023 | Kayyoor ........... G06F 16/24526 |
| | | 707/610 |
| 11,650,032 B2* | 5/2023 | Gilman ................. F42C 19/083 |
| | | 102/431 |
| 11,664,568 B2* | 5/2023 | Levy ........................ H01P 3/16 |
| | | 375/220 |
| 2001/0044791 A1 | 11/2001 | Richter |
| 2002/0022986 A1 | 2/2002 | Coker |
| 2002/0029161 A1 | 3/2002 | Brodersen |
| 2002/0029376 A1 | 3/2002 | Ambrose |
| 2002/0035577 A1 | 3/2002 | Brodersen |
| 2002/0042264 A1 | 4/2002 | Kim |
| 2002/0042843 A1 | 4/2002 | Diec |
| 2002/0072951 A1 | 6/2002 | Lee |
| 2002/0082892 A1 | 6/2002 | Raffel |
| 2002/0129352 A1 | 9/2002 | Brodersen |
| 2002/0140731 A1 | 10/2002 | Subramaniam |
| 2002/0141351 A1* | 10/2002 | Maltz ..................... H04L 41/12 |
| | | 370/254 |
| 2002/0141352 A1* | 10/2002 | Fangman .......... H04L 61/2514 |
| | | 370/254 |
| 2002/0143926 A1* | 10/2002 | Maltz ................... H04L 41/142 |
| | | 709/224 |

(56) References Cited

U.S. PATENT DOCUMENTS

| | | | |
|---|---|---|---|
| 2002/0143927 A1* | 10/2002 | Maltz | H04L 41/12 709/224 |
| 2002/0143929 A1* | 10/2002 | Maltz | H04L 41/0213 709/224 |
| 2002/0143942 A1* | 10/2002 | Li | H04L 67/1097 709/225 |
| 2002/0143997 A1 | 10/2002 | Huang | |
| 2002/0152102 A1 | 10/2002 | Brodersen | |
| 2002/0161734 A1 | 10/2002 | Stauber | |
| 2002/0162090 A1 | 10/2002 | Parnell | |
| 2002/0165742 A1 | 11/2002 | Robins | |
| 2002/0194342 A1 | 12/2002 | Lu | |
| 2003/0004971 A1 | 1/2003 | Gong | |
| 2003/0018705 A1 | 1/2003 | Chen | |
| 2003/0018830 A1 | 1/2003 | Chen | |
| 2003/0041167 A1 | 2/2003 | French | |
| 2003/0041238 A1 | 2/2003 | French | |
| 2003/0066031 A1 | 4/2003 | Laane | |
| 2003/0066032 A1 | 4/2003 | Ramachandran | |
| 2003/0069936 A1 | 4/2003 | Warner | |
| 2003/0070000 A1 | 4/2003 | Coker | |
| 2003/0070004 A1 | 4/2003 | Mukundan | |
| 2003/0070005 A1 | 4/2003 | Mukundan | |
| 2003/0074418 A1 | 4/2003 | Coker | |
| 2003/0088545 A1 | 5/2003 | Subramaniam | |
| 2003/0120675 A1 | 6/2003 | Stauber | |
| 2003/0151633 A1 | 8/2003 | George | |
| 2003/0159136 A1 | 8/2003 | Huang | |
| 2003/0177162 A1 | 9/2003 | Staiger | |
| 2003/0187921 A1 | 10/2003 | Diec | |
| 2003/0189600 A1 | 10/2003 | Gune | |
| 2003/0191743 A1 | 10/2003 | Brodersen | |
| 2003/0204427 A1 | 10/2003 | Gune | |
| 2003/0206192 A1 | 11/2003 | Chen | |
| 2003/0225730 A1 | 12/2003 | Warner | |
| 2004/0001092 A1 | 1/2004 | Rothwein | |
| 2004/0010489 A1 | 1/2004 | Rio | |
| 2004/0015981 A1 | 1/2004 | Coker | |
| 2004/0027388 A1 | 2/2004 | Berg | |
| 2004/0128001 A1 | 7/2004 | Levin | |
| 2004/0172629 A1 | 9/2004 | Tene | |
| 2004/0186860 A1 | 9/2004 | Lee | |
| 2004/0193510 A1 | 9/2004 | Catahan | |
| 2004/0199489 A1 | 10/2004 | Barnes-Leon | |
| 2004/0199536 A1 | 10/2004 | Barnes Leon | |
| 2004/0199543 A1 | 10/2004 | Braud | |
| 2004/0249854 A1 | 12/2004 | Barnes-Leon | |
| 2004/0260534 A1 | 12/2004 | Pak | |
| 2004/0260659 A1 | 12/2004 | Chan | |
| 2004/0268299 A1 | 12/2004 | Lei | |
| 2005/0050555 A1 | 3/2005 | Exley | |
| 2005/0075917 A1 | 4/2005 | Flores | |
| 2005/0091098 A1 | 4/2005 | Brodersen | |
| 2005/0138110 A1 | 6/2005 | Redlich | |
| 2005/0149612 A1 | 7/2005 | Messinger | |
| 2005/0177549 A1 | 8/2005 | Hornick | |
| 2006/0268764 A1 | 11/2006 | Harris | |
| 2007/0074208 A1 | 3/2007 | Ling | |
| 2007/0089111 A1 | 4/2007 | Robinson | |
| 2008/0059384 A1 | 3/2008 | Eglen | |
| 2008/0059495 A1 | 3/2008 | Kiessig | |
| 2008/0059636 A1 | 3/2008 | Freimuth | |
| 2008/0062891 A1 | 3/2008 | Van Der Merwe | |
| 2008/0114628 A1 | 5/2008 | Johnson | |
| 2008/0141117 A1 | 6/2008 | King | |
| 2008/0177994 A1 | 7/2008 | Mayer | |
| 2008/0250016 A1 | 10/2008 | Farrar | |
| 2008/0270610 A1 | 10/2008 | John | |
| 2008/0273591 A1 | 11/2008 | Brooks | |
| 2008/0281610 A1 | 11/2008 | Yoshida | |
| 2008/0320001 A1 | 12/2008 | Gaddam | |
| 2009/0037421 A1* | 2/2009 | Gamble | G06F 16/951 |
| 2009/0138362 A1 | 5/2009 | Schroedl | |
| 2009/0172035 A1 | 7/2009 | Lessing | |
| 2009/0177744 A1 | 7/2009 | Marlow | |
| 2009/0178144 A1 | 7/2009 | Redlich | |
| 2009/0193121 A1 | 7/2009 | Shin | |
| 2009/0313067 A1 | 12/2009 | Costa | |
| 2010/0017415 A1 | 1/2010 | Kurumai | |
| 2010/0025565 A1 | 2/2010 | Benic | |
| 2010/0070448 A1 | 3/2010 | Omoigui | |
| 2010/0082602 A1 | 4/2010 | Ganapathi | |
| 2010/0125565 A1 | 5/2010 | Burger | |
| 2011/0010236 A1 | 1/2011 | Bayana Trillana | |
| 2011/0118300 A1 | 5/2011 | Harris | |
| 2011/0145363 A1 | 6/2011 | Ananthanarayanan | |
| 2011/0153368 A1 | 6/2011 | Pierre | |
| 2011/0184789 A1 | 7/2011 | Kirsch | |
| 2012/0011518 A1 | 1/2012 | Duan | |
| 2012/0036552 A1 | 2/2012 | Dare | |
| 2012/0117404 A1 | 5/2012 | Lorch | |
| 2012/0129517 A1 | 5/2012 | Fox | |
| 2012/0151062 A1 | 6/2012 | Gusev | |
| 2013/0006987 A1 | 1/2013 | Stevenne | |
| 2013/0024511 A1 | 1/2013 | Dunn | |
| 2013/0030873 A1 | 1/2013 | Davidson | |
| 2013/0305169 A1 | 11/2013 | Gold | |
| 2013/0316724 A1 | 11/2013 | Saeedi | |
| 2013/0339099 A1 | 12/2013 | Aidroos | |
| 2014/0007183 A1 | 1/2014 | Qureshi | |
| 2014/0199962 A1 | 7/2014 | Mohammed | |
| 2014/0323158 A1 | 10/2014 | Wormald | |
| 2014/0365283 A1 | 12/2014 | Stenneth | |
| 2014/0378091 A1 | 12/2014 | Irwin | |
| 2015/0120587 A1 | 4/2015 | Bramel | |
| 2015/0134693 A1 | 5/2015 | Chan | |
| 2015/0379427 A1 | 12/2015 | Dirac | |
| 2015/0379428 A1 | 12/2015 | Dirac | |
| 2016/0086108 A1 | 3/2016 | Abelow | |
| 2016/0094414 A1 | 3/2016 | Merenda | |
| 2017/0034023 A1 | 2/2017 | Nickolov | |
| 2019/0205773 A1 | 7/2019 | Ackerman | |
| 2019/0236149 A1 | 8/2019 | Kuruvada | |
| 2019/0310977 A1 | 10/2019 | Pal | |
| 2020/0356569 A1 | 11/2020 | Zhong | |
| 2022/0164372 A1* | 5/2022 | Krishna | G06F 16/285 |

OTHER PUBLICATIONS

Alternatives for Scheduling Virtual Machines in Real-Time Embedded Systems Robert Kaiser Published: 2008.

A Study and Performance Evaluation of the Multi-Tenant Data Tier Design Patterns for Service Oriented Computing Zhi Hu Wang, Chang Jie Guo, Bo Gao, Wei Sun, Zhen Zhang, Wen Hao An Published: 2008: ISBN: 978-0-7695-3395-7.

Final Office Action for U.S. Appl. No. 13/270,775 dated Oct. 16, 2014, 9 pages.

Non-Final Office Action for U.S. Appl. No. 14/953,672 dated Feb. 7, 2019, 12 pages.

Non-Final Office Action for U.S. Appl. No. 13/270,775 dated Apr. 9, 2014, 11 pages.

Office Action (Final Rejection) dated Jul. 29, 2015 for U.S. Appl. No. 13/270,775 (pp. 1-9).

Office Action (Non-Final Rejection) dated Apr. 7, 2016 for U.S. Appl. No. 13/270,775 (pp. 1-11).

Office Action (Final Rejection) dated Aug. 5, 2016 for U.S. Appl. No. 13/270,775 (pp. 1-12).

Office Action (Non-Final Rejection) dated Apr. 3, 2015 for U.S. Appl. No. 13/270,775 (pp. 1-9).

Office Action (Non-Final Rejection) dated Mar. 6, 2014 for U.S. Appl. No. 13/276,531 (pp. 1-9).

Office Action (Final Rejection) dated Sep. 19, 2014 for U.S. Appl. No. 13/276,531 (pp. 1-10).

Office Action (Notice of Allowance and Fees Due (PTOL-85)) dated Jan. 5, 2015 for U.S. Appl. No. 13/276,531 (pp. 1-7).

Office Action (Non-Final Rejection) dated Jun. 6, 2013 for U.S. Appl. No. 13/295,644 (pp. 1-11).

Office Action (Final Rejection) dated Sep. 26, 2013 for U.S. Appl. No. 13/295,644 (pp. 1-10).

Office Action (Non-Final Rejection) dated Mar. 13, 2014 for U.S. Appl. No. 13/295,644 (pp. 1-9).

(56) References Cited

OTHER PUBLICATIONS

Office Action (Final Rejection) dated Sep. 30, 2014 for U.S. Appl. No. 13/295,644 (pp. 1-11).
Office Action (Non-Final Rejection) dated Mar. 25, 2015 for U.S. Appl. No. 13/295,644 (pp. 1-15).
Office Action (Notice of Allowance and Fees Due (PTOL-85)) dated Jul. 23, 2015 for U.S. Appl. No. 13/295,644 (pp. 1-11).
Office Action (Non-Final Rejection) dated Apr. 5, 2018 for U.S. Appl. No. 14/703,682 (pp. 1-6).
Office Action (Notice of Allowance and Fees Due (PTOL-85)) dated Sep. 19, 2018 for U.S. Appl. No. 14/703,682 (pp. 1-7).
Office Action (Notice of Allowance and Fees Due (PTOL-85)) dated Nov. 16, 2018 for U.S. Appl. No. 14/703,682 (pp. 1-2).
Office Action (Non-Final Rejection) dated Dec. 30, 2016 for U.S. Appl. No. 14/805,056 (pp. 1-9).
Office Action (Non-Final Rejection) dated Dec. 5, 2017 for U.S. Appl. No. 14/805,056 (pp. 1-11).
Office Action (Final Rejection) dated Jan. 14, 2020 for U.S. Appl. No. 14/805,056 (pp. 1-12).
Office Action (Final Rejection) dated May 8, 2017 for U.S. Appl. No. 14/805,056 (pp. 1-6).
Office Action (Final Rejection) dated Apr. 24, 2018 for U.S. Appl. No. 14/805,056 (pp. 1-5).
Office Action (Non-Final Rejection) dated Aug. 10, 2018 for U.S. Appl. No. 14/805,056 (pp. 1-6).
Office Action (Final Rejection) dated Dec. 12, 2018 for U.S. Appl. No. 14/805,056 (pp. 1-6).
Office Action (Non-Final Rejection) dated Jun. 27, 2019 for U.S. Appl. No. 14/805,056 (pp. 1-10).
Office Action (Notice of Allowance and Fees Due (PTOL-85)) dated Apr. 28, 2020 for U.S. Appl. No. 14/805,056 (pp. 1-7).
Office Action (Non-Final Rejection) dated Apr. 8, 2016 for U.S. Appl. No. 14/953,672 (pp. 1-18).
Office Action (Final Rejection) dated Oct. 20, 2016 for U.S. Appl. No. 14/953,672 (pp. 1-18).
Office Action (Final Rejection) dated Jun. 29, 2017 for U.S. Appl. No. 14/953,672 (pp. 1-13).
Office Action (Non-Final Rejection) dated Feb. 7, 2017 for U.S. Appl. No. 14/953,672 (pp. 1-11).
Office Action (Non-Final Rejection) dated Dec. 15, 2017 for U.S. Appl. No. 14/953,672 (pp. 1-14).
Office Action (Final Rejection) dated Aug. 28, 2018 for U.S. Appl. No. 14/953,672 (pp. 1-13).
Office Action (Notice of Allowance and Fees Due (PTOL-85)) dated Aug. 23, 2019 for U.S. Appl. No. 14/953,672 (pp. 1-18).
Office Action (Non-Final Rejection) dated Nov. 18, 2019 for U.S. Appl. No. 16/259,964 (pp. 1-8).
Office Action (Final Rejection) dated Apr. 6, 2020 for U.S. Appl. No. 16/259,964 (pp. 1-5).
Office Action (Notice of Allowance and Fees Due (PTOL-85)) dated Jun. 22, 2020 for U.S. Appl. No. 16/259,964 (pp. 1-7).
Office Action (Non-Final Rejection) dated Jul. 8, 2021 for U.S. Appl. No. 16/568,149 (pp. 1-9).
Office Action (Notice of Allowance and Fees Due (PTOL-85)) dated Aug. 13, 2021 for U.S. Appl. No. 16/568,149 (pp. 1-7).
Office Action (Non-Final Rejection) dated Feb. 17, 2022 for U.S. Appl. No. 17/070,836 (pp. 1-5).
Office Action (Notice of Allowance and Fees Due (PTOL-85)) dated Jul. 13, 2022 for U.S. Appl. No. 17/070,836 (pp. 1-8).
G. Tesauro, N. K. Jong, R. Das and M. N. Bennani, "A Hybrid Reinforcement Learning Approach to Autonomic Resource Allocation," 2006 IEEE International Conference on Autonomic Computing, Dublin, Ireland, 2006, pp. 65-73, doi: 10.1109/ICAC.2006. 1662383.

\* cited by examiner

METHODS AND SYSTEMS FOR MAKING EFFECTIVE USE OF SYSTEM RESOURCES

INCORPORATION BY REFERENCE

This application is a continuation application and claims priority to U.S. patent application Ser. No. 17/070,836, entitled "METHODS AND SYSTEMS FOR MAKING EFFECTIVE USE OF SYSTEM RESOURCES," filed Oct. 14, 2020, which is related to, and claims priority to, U.S. patent application Ser. No. 16/259,964 entitled "METHODS AND SYSTEMS FOR MAKING EFFECTIVE USE OF SYSTEM RESOURCES," filed Jan. 28, 2019, now U.S. Pat. No. 10,810,514 with an issue date of Oct. 20, 2020, the entire contents of which are incorporated herein by reference; which is a continuation of U.S. patent application Ser. No. 14/703,682 entitled "METHODS AND SYSTEMS FOR MAKING EFFECTIVE USE OF SYSTEM RESOURCES," filed May 4, 2015, now U.S. Pat. No. 10,192,169 with an issue date of Jan. 29, 2019, the entire contents of which are incorporated herein by reference; which is a continuation of U.S. patent application Ser. No. 13/276,531 entitled "METHODS AND SYSTEMS FOR MAKING EFFECTIVE USE OF SYSTEM RESOURCES," filed Oct. 19, 2011, now U.S. Pat. No. 9,026,624 with an issue date of May 5, 2015, the entire contents of which are incorporated herein by reference; and is further related to, and claims priority to, U.S. Provisional Patent Application No. 61/421,989, entitled "METHODS AND SYSTEMS FOR MAKING EFFECTIVE USE OF SYSTEM RESOURCES IN AN ON-DEMAND ENVIRONMENT," filed Dec. 10, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Use of machine learning techniques are described. More particularly, uses of machine learning to improve use and allocation of system resources are described.

BACKGROUND

Systems that service incoming requests have various mechanisms to respond to requests in an efficient manner. For example, load-balancing strategies have been developed to distribute requests. Other strategies have also been developed. However, these strategies typically focus on request quantities or request sources, which provide an improved, but not optimal result.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

In the description that follows, various techniques for utilizing machine learning are described. The results of the machine learning may be applied to database queries to predict the resources necessary to answer the query. For example, observing table size, a number of nested loops and a selectivity score may be useful in predicting the number of rows in the result and the necessary runtime for the query. From this prediction, appropriate resources may be allocated to the query. Other examples and strategies are described in greater detail below.

Figure 1:
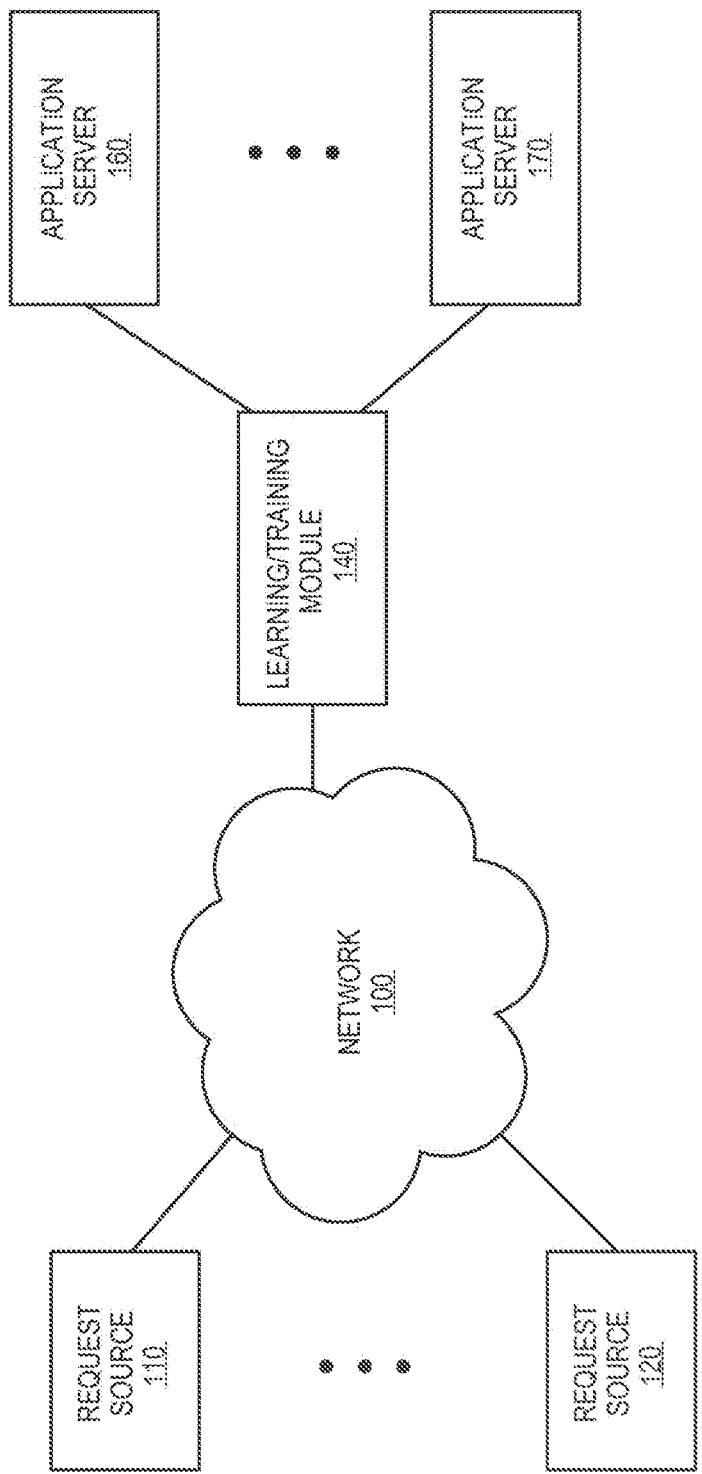
FIG. 1 is a block diagram of one embodiment of a networked system of request sources and application servers that my service requests.

FIG. 1 is a block diagram of one embodiment of a networked system of request sources and application servers that my service requests. The example of FIG. 1 provides an example with two request sources, one learning module and two application servers; however, any number of request sources, learning modules and application servers can be supported using the techniques described herein.

Network 100 may be any type of network that provides connections between request sources 110 and 120 and application servers 160 and 170. Network 100 can be, for example, the Internet, a local area network (LAN), and/or any combination of networks and subnetworks. Request sources 110 and 120 operate to request services and/or resources from application servers 160 and 170. Request sources 110 and 120 can be, for example, computer systems running browser applications that allow a user thereof to interact with application servers 160 and 170.

Learning/training module 140 represents one or more learning modules that may apply the machine learning techniques described herein. Learning/training module 140 applies various machine learning techniques described herein to predict resources required by an incoming request. Learning/training module 140, or another component, can use that information to distribute requests among application servers (e.g., application servers 160, 170).

In the example of FIG. 1, learning/training module 140 is illustrated as a single entity; however, in alternate embodiments, the learning and training functionality may be provided by different entities. In one embodiment, the output of the training portion of learning/training module 140 is a statistical model for each database instance provided by the application servers. The training portion of learning/training module 140 utilizes the statistical models to provide predictions at runtime within the application servers. In one embodiment, an application program interface (API) may be provided in JAVA® and not with network calls. In alternate embodiments, other interfaces may be supported.

In one embodiment, learning/training module 140 operates to predict an execution time and a number of rows (indicating required buffer size) for an incoming request. This information is used for scheduling purposes. Other and/or different outcomes can also be predicted and utilized for scheduling purposes. In one embodiment, the techniques described herein are applicable in a multitenant environment. Embodiments of multitenant environments are described in greater detail below.

In one embodiment, machine learning/training module 140 implements a collection of classification and regression algorithms to provide one or more classifiers. Generally, a classifier is an agent or component that maps input values (referred to as features) to classes (referred to labels). For example, to estimate if it may rain tomorrow, the features could be things like "today's temperature", "whether it is raining today", "whether it is windy today", "whether it is cloudy today", etc. The label is whether tomorrow rain is observed. First, the model is built on the training data which has all the features and labels defined, mathematically during training classifiers construct a function that can predict the labels based on the features. Once the model has been trained a label may be predicted based on the data points for which input features are known, but not the label. Various classifiers build different functions and therefore have different accuracy and run-time characteristics.

In one embodiment, supervised learning techniques may be utilized. Supervised learning algorithms require a set of labeled data points to build internal representation of the model. Each training data point should contain all the feature values and a label. Usually larger training sets improve the accuracy of classifier. Once the training dataset is created, a problem object may be created. This object contains the list of labels and number of features and describes the shape of classifier problem. Next, the algorithm to train a model with is selected. The model may then be trained, for example, as described below.

Figure 2:
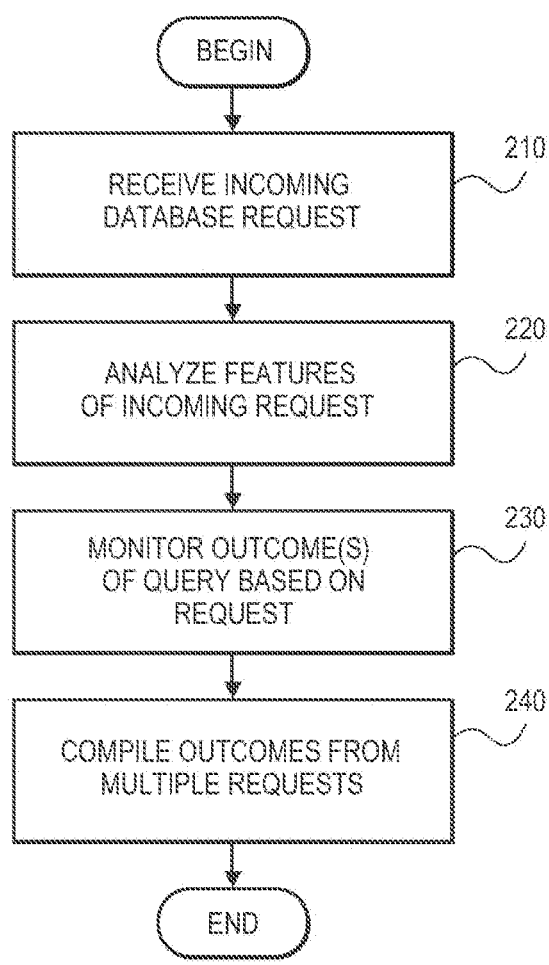
FIG. 2 is a flow diagram of one embodiment of a technique for machine learning utilizing incoming database requests.

FIG. 2 is a flow diagram of one embodiment of a technique for machine learning utilizing incoming database requests. The technique of FIG. 2 generally refers to the learning portion for acquiring sufficient information to predict outcomes for subsequent requests that include database queries.

An incoming request is received, 210. The request may have various types of information including one or more database queries to be performed. In one embodiment, one or more of the following features may be monitored or analyzed as part of the machine learning process.

A learning module, or other component, may determine a number of nested joins in a database query, for example, by reading a "nlJoinInstanceCount" variable. In one embodiment, joins without hints are assumed to be nested loop joins. The learning module, or other component, may determine a number of hash joins in a database query, for example, by reading a "hashJoinInstanceCount" variable.

The learning module, or other component, may determine a sum of cardinalities of the database request, for example, by reading a "hashJoinSumCardinality" variable to estimate a cardinality of a main table associated with the request. The learning module, or other component, may determine a main table cardinality corresponding to a database query, for example, by reading a "mainTableCardinality" variable.

The learning module, or other component, may determine a storage count of the main table of the database request, for example, by reading a "mainTableStorageCount" variable.

The learning module, or other component, may determine a selectivity estimate corresponding to a database query, for example, by reading a "mainTableSelectivity" variable.

The learning module, or other component, may determine a number of secondary queries in the database request, for example, by reading a "numSecondaryQueries" variable. The learning module, or other component, may determine an application processor state, for example, by reading a "appCpu" variable. The learning module, or other component, may determine an application memory state, for example, by reading a "appMem" variable.

The learning module, or other component, may determine a database processor state, for example, by reading a "dbCpu" variable. The learning module, or other component, may determine a number of skinny tables used by the database query, for example, by reading a "skinnyTableCount" variable. Other and/or different features may also be analyzed in a similar manner.

Information gathered from the incoming request may be analyzed, 220. For example, information gathered may be combined or otherwise used in a calculation to be used for training purposes.

The outcomes of the requests are monitored, 230. The outcomes are compiled from multiple requests, 240. By compiling results from multiple requests, various characteristics of future requests may be predicted with reasonable certainty. With this information, resources required to service a particular request may also be predicted with enough accuracy that the resource requirements may be used for scheduling purposes. This may provide an overall improvement in system efficiency and/or performance.

Figure 3:
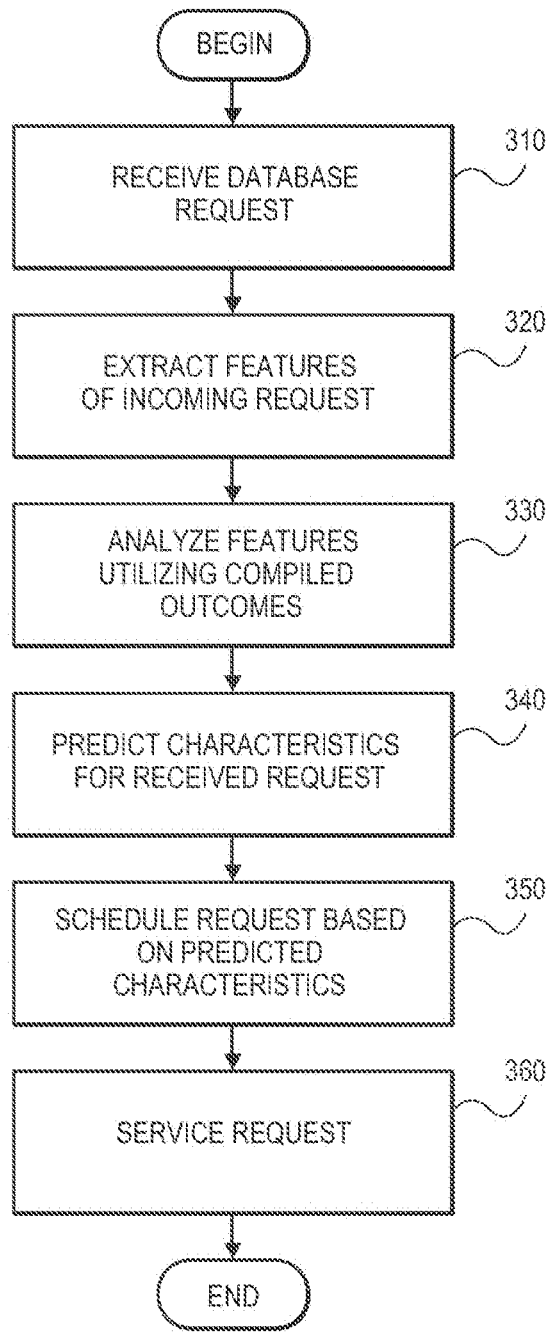
FIG. 3 is a flow diagram of one embodiment of a technique for utilizing machine learning to predict outcomes corresponding to database requests.

FIG. 3 is a flow diagram of one embodiment of a technique for utilizing machine learning to predict outcomes corresponding to database requests. The technique of FIG. 3 generally refers to the application portion of applying the collected and analyzed information to predict outcomes or resource requirements for subsequent requests that include database queries.

An incoming request is received, 310. The request may have various types of information including one or more database queries to be performed. In one embodiment, one or more of the features described above may be analyzed or otherwise utilized as part of the machine learning prediction process.

Features that are to be used for prediction purposes are extracted from the request, 320. One or more of the features discussed above may be extracted. These extracted features may be utilized to perform analysis of the features from the received request, 330. In one embodiment, a learning module, 430 or other system component may access a compilation of features and corresponding outcomes to interpolate or extrapolate a predicted outcome characteristic, 340. In another embodiment, the compilation of features and corresponding outcomes may also include interpolated or extrapolated predicted outcome characteristics, so that the predicted characteristics are available by simple look up, 340.

The request may be scheduled utilizing the predicted characteristics, 350. Scheduling may be based on, for example, prediction of an execution time and a number of rows (indicating required buffer size) for an incoming request. Thus, processor load and or memory availability as compared to the predicted execution time and number of rows, may be factors considered in scheduling. Other factors and scheduling considerations may also be utilized. The request may be serviced by the assigned resources, 360.

In one embodiment, when the predicted characteristics indicate a relatively small set size, a smaller buffer may be allocated, which may result in a more efficient utilization of resources. In one embodiment if the prediction is incorrect, the buffer may be dynamically resized to be large enough if more rows than were predicted are returned from the database. This may limit the cost in terms of network round trips of a misprediction. In one embodiment, a portion of the application servers (e.g., 50%, 10%, 5%) may utilize the prediction information while the remaining application servers may operate without the prediction information. This may allow for analysis and possible fine tuning of the prediction information.

In one embodiment, the machine learning techniques may be applied in a multitenant database environment. Example multitenant database environments are provided below. Other multitenant and/or database environments may also utilize the techniques described herein.

Figure 4:
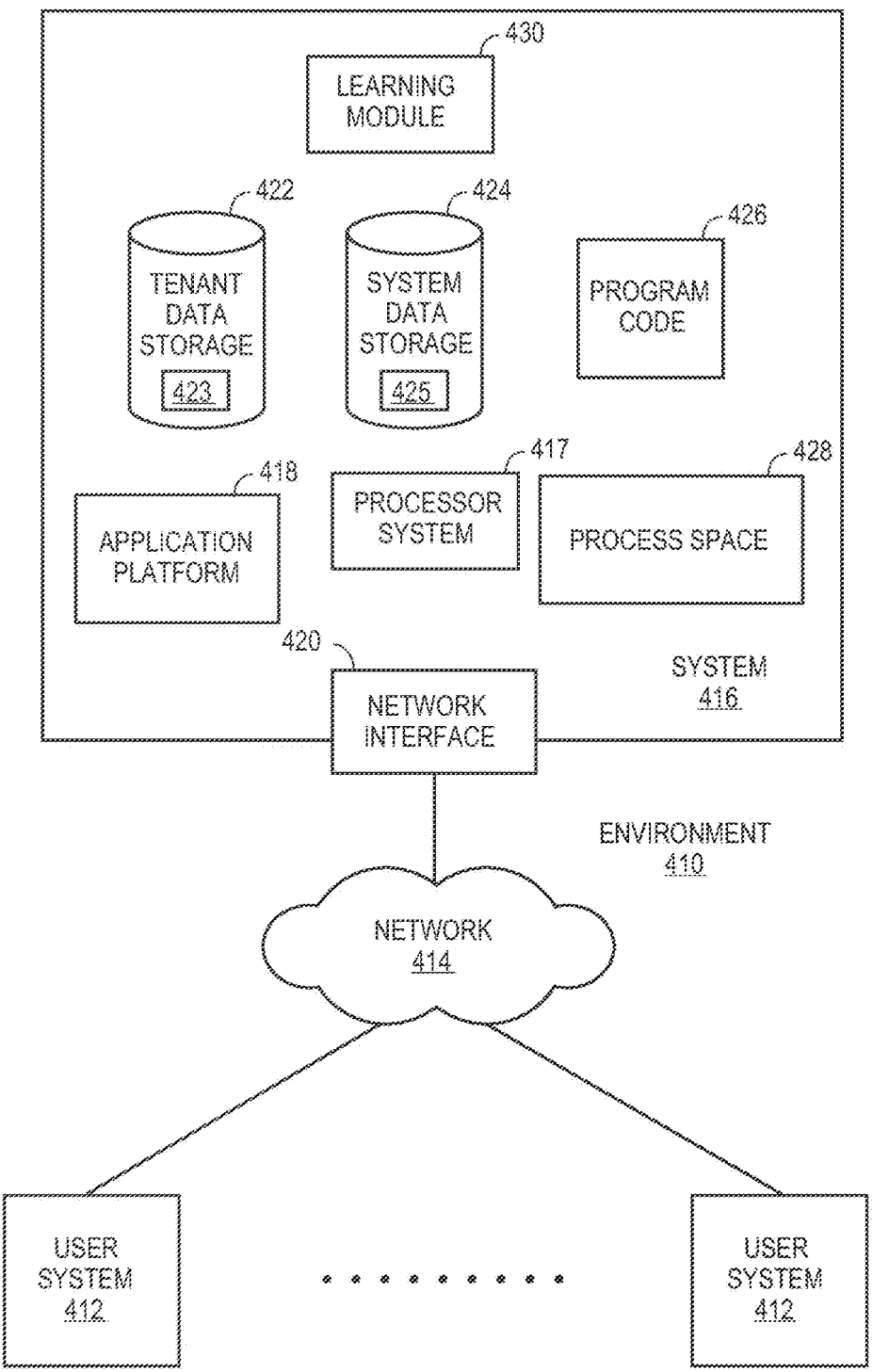
FIG. 4 illustrates a block diagram of an environment where an on-demand database service might be used.

FIG. 4 illustrates a block diagram of an environment 410 wherein an on-demand database service might be used. Environment 410 may include user systems 412, network 414, system 416, processor system 417, application platform 18, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein.

A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator.

In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414.

Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 5:
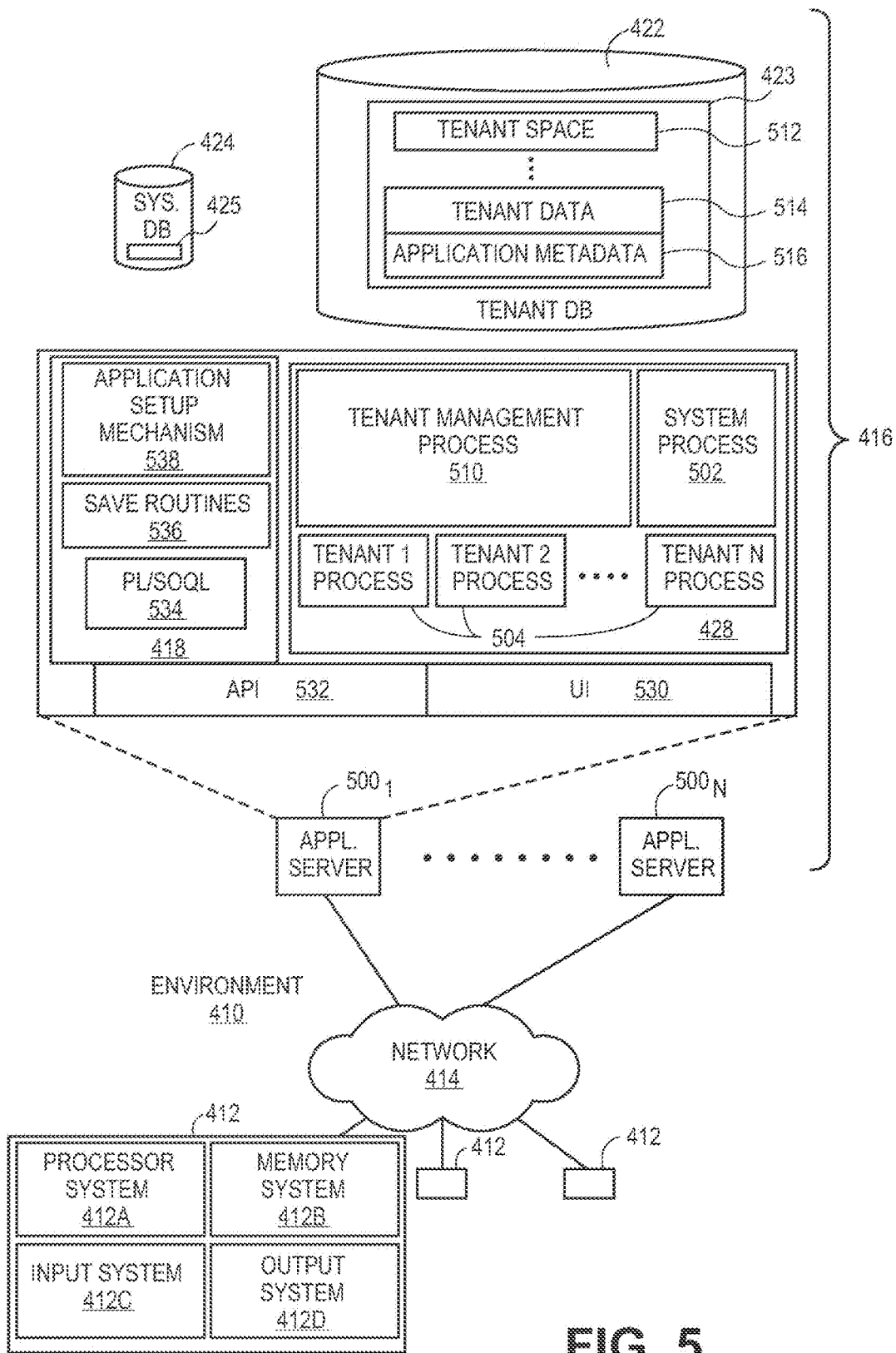
FIG. 5 illustrates a block diagram of an environment where an on-demand database service might be used.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage space 512, tenant data 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks.

As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage spaces 512, which can be either a physical arrangement and/or a logical arrangement of data. Within each tenant storage space 512, tenant data 514 and application metadata 516 might be similarly allocated for each user. For example, a copy of a user's most recently used (MRU) items might be stored to tenant data 514. Similarly, a copy of MRU items for an entire organization that is a tenant might be stored to tenant storage space 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532.

A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500.

In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424.

System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method, comprising:
receiving, with one or more hardware processing devices, a plurality of database queries to be performed using resources associated with a database, each database query having an associated group of features;
analyzing, utilizing machine learning techniques, the group of features for each database query to collect query execution data observations about the plurality of database queries;
creating, utilizing machine learning techniques, a machine learning model based on the query execution data observations, the machine learning model comprising a function configured to predict a resource allocation of a subsequent database query;
predicting, with the machine learning model, a particular resource allocation for a particular subsequent query; and
providing, with the one or more hardware processing devices, resources to service the particular subsequent database query according to the particular resource allocation.

2. The method of claim 1, further comprising:
generating or updating, without user intervention, a query execution plan based, at least in part, on the query execution data observations.

3. The method of claim 1, the particular resource allocation predicting a number of nodes to execute a workload.

4. The method of claim 1, wherein the particular resource allocation comprises at least one query execution plan.

5. The method of claim 1, wherein the group of features comprises one or more of:
an application server processor state; or
an application server memory state.

6. The method of claim 1, the machine learning model modeling one or more of: memory usage, network load, or execution time.

7. The method of claim 1, the group of features including cardinalities of operations in a query execution plan.

8. A non-transitory machine-readable storage medium having computer program instructions stored therein, the computer program instructions configured such that, when executed by one or more processors, the computer program instructions cause the one or more processors to:
obtain, with one or more hardware processing devices, a plurality of database queries to be performed using resources associated with a database, each database query having an associated group of features;
analyze, utilizing machine learning techniques, the group of features for each database query to collect query execution data observations about the plurality of database queries;
create, utilizing machine learning techniques, a machine learning model based on the query execution data observations, the machine learning model comprising a function configured to predict a resource allocation of a subsequent database query;
predict, with the machine learning model, a particular resource allocation for a particular subsequent query; and
providing, with the one or more hardware processing devices, resources to service the particular subsequent database query according to the particular resource allocation.

9. The non-transitory machine-readable storage medium of claim 8, the computer program instructions further configured to cause the one or more processors to:
generating or updating, without user intervention, a query execution plan based, at least in part, on the query execution data observations.

10. The non-transitory machine-readable storage medium of claim 8, the particular resource allocation predicting a number of nodes to execute a workload.

11. The non-transitory machine-readable storage medium of claim 8, wherein the particular resource allocation comprises at least one query execution plan.

12. The non-transitory machine-readable storage medium of claim 8, wherein the group of features comprises one or more of:
   an application server processor state; or
   an application server memory state.

13. The non-transitory machine-readable storage medium of claim 8, the machine learning model modeling one or more of: memory usage, network load, or execution time.

14. A system comprising:
   a database system implemented using a server system, the database system configurable to cause:
   obtaining, with one or more hardware processing devices, a plurality of database queries to be performed using resources associated with a database, each database query having an associated group of features;
   analyzing, utilizing machine learning techniques, the group of features for each database query to collect query execution data observations about the plurality of database queries;
   creating, utilizing machine learning techniques, a machine learning model based on the query execution data observations, the machine learning model comprising a function configured to predict a resource allocation of a subsequent database query;
   predicting, with the machine learning model, a particular resource allocation for a particular subsequent query; and
   providing, with the one or more hardware processing devices, resources to service the particular subsequent database query according to the particular resource allocation.

15. The system of claim 14, the database system further configurable to cause:
   generating or updating, without user intervention, a query execution plan based, at least in part, on the query execution data observations.

16. The system of claim 14, the particular resource allocation predicting a number of nodes to execute a workload.

17. The system of claim 14, wherein the particular resource allocation comprises at least one query execution plan.

18. The system of claim 14, wherein the group of features comprises one or more of:
   an application server processor state; or
   an application server memory state.

19. The system of claim 14, the machine learning model modeling one or more of: memory usage, network load, or execution time.

20. The system of claim 14, the group of features including cardinalities of operations in a query execution plan.

* * * * *